United States Patent Office 3,264,804
Patented August 9, 1966

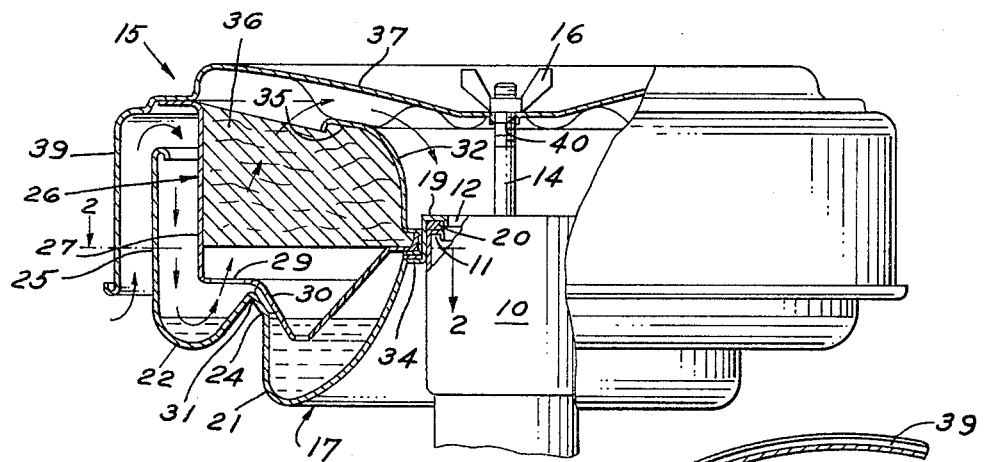
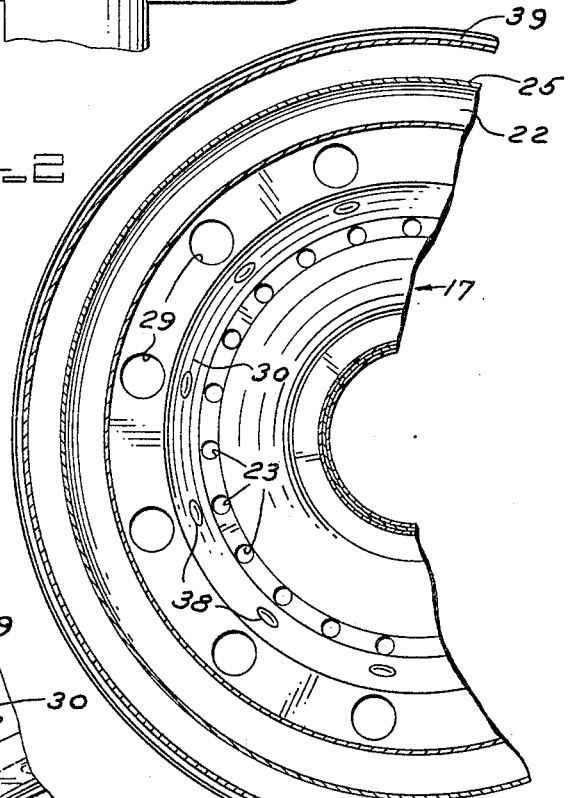
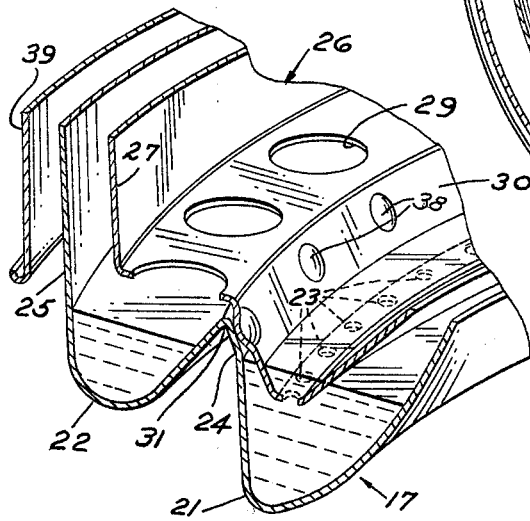

---

3,264,804
OIL BATH AIR CLEANER
Ralph E. Sendelbach, Detroit, Mich., assignor to Ford Motor Company, Dearborn, Mich., a corporation of Delaware
Filed July 19, 1963, Ser. No. 296,267
4 Claims. (Cl. 55—223)

This invention relates to air cleaners of the oil bath type for the air intakes of internal combustion engines.

Oil bath air cleaners customarily are provided with a mass of loosely packed, stranded filter material through which the engine intake air is drawn. An oil sump in the cleaner traps some of the dirt particles carried by the incoming air and also serves as a supply of oil which is carried upwardly into the stranded material by the air, where it traps additional dirt particles. Any excess of oil in the filter material drains back to the sump and is recirculated.

The oil bath air cleaner of the present invention comprises interfitting upper and lower body members. The lower body member provides a pair of concentric troughs separated by a dividing wall. The upper body member, which holds the loosely packed stranded filter material, is slightly spaced from the upper edge of the dividing wall to provide a metering annulus through which oil is aspirated into the outer trough and the incoming air. A series of spacers, which preferably are provided by being pressed from either the upper or lower body member, determine the size of the annular space and control of aspiration of oil from the inner trough. The construction provides an air cleaner which is easily manufactured and assembled and which contains a reduced number of parts as compared to conventional air cleaners.

Among the objects of the present invention are to provide an air cleaner of the oil bath type which is easily and cheaply manufactured and assembled, which is easily serviced, which contains a reduced number of parts, and generally to improve air cleaners of the type described.

Other objects and objects relating to details of construction and use will be more apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification in which:

FIGURE 1 is a side elevation of a carburetor having an air cleaner according to the present invention, only a portion of the carburetor being shown and the air cleaner being shown partially in vertical cross-section.

FIGURE 2 is a cross-sectional view taken along line 2—2 of FIGURE 1.

FIGURE 3 is a vertical cross-sectional view of a portion of the air cleaner of FIGURES 1 and 2.

Referring now to the drawings, the air cleaner of the present invention is intended for mounting on a down draft carburetor generally indicated as 10. The air cleaner fits over the upper portion of the carburetor to reduce overall height of the assembly and is received on an annular upstanding flange 11 provided on the carburetor surrounding the carburetor air intake 12. A stud 14 extends upwardly axially of the intake 12 for retaining the air cleaner, generally indicated as 15. A wing nut 16 threadedly engaged with the top portion of the stud holds the air cleaner in position on the carburetor and holds the several portions of the air cleaner together as will be explained.

According to the present invention, the air cleaner comprises a lower body portion 17 which is formed of a sheet metal annulus having the cross-section indicated in the drawing. The body portion 17 has an inner flange 19 which is formed to engage the annular flange 11 of the carburetor and may be provided with a gasket 20 to seal against leakage of air directly into the carburetor. The body portion 17 is provided with inner and outer concentric troughs 21 and 22, respectively, which extend completely about the carburetor and are separated by a dividing wall 24. Preferably, the inner trough 21 is deeper than the outer trough 22. The lower body portion 17 is provided with an upwardly extending peripheral wall 25 which preferably is cylindrical.

An upper body portion 26 is received within the lower body portion. The upper body portion has a peripheral wall 27 which is spaced radially inwardly from the wall 25 of the lower body portion to define an air intake passage therebetween. The body portion 26 is provided with a series of spaced openings 29 immediately above the outer trough 22 for passage of air and is provided with a series of drain holes 23 above the inner trough 21. Preferably, the upper body portion has a conically shaped surface 30 extending parallel to and slightly spaced from a similarly inclined portion 31 at the top of the dividing wall 24 between the troughs. The inner periphery 32 of the upper body portion 26 makes sealing engagement with the lower body portion adjacent its inner flange 19. If desired, a gasket 34 may be provided to assure a tight seal. The inner flange 35 of the upper body portion extends upwardly to contain a body 36 of stranded filter material which is loosely packed within the upper body portion.

A sheet metal cover 37 is engaged with the peripheral wall 27 of the upper body portion to seal the top of the filter. Preferably, an annular peripheral flange 39 extends downwardly for at least a portion of the height of the air cleaner outside of the peripheral wall 25 of the lower body portion. The flange 39 may be a portion of either the cover 37 or the upper body portion 26.

When assembled, the upper body portion 26 is telescopically received within the lower body portion 17 with the surfaces 30 and 31 slightly spaced to provide a narrow, uniform, annular space between the two body portions. Spacers 38 are provided at intervals to maintain the annular space uniform throughout its length. These spacers may be formed by bosses stamped when forming either the upper or lower body portion.

The air cleaner is held in assembled relation by the carburetor stud 14 which extends through a hole 40 in the center of the cover. Tightening of the wing nut 16 on the stud holds the air cleaner in position on the carburetor and also holds the cover 37 and body portions 17 and 26 in tightly assembled relation.

For operation, the inner trough 21 is filled with oil. Passage of the air through the filter in the direction generally indicated by the arrows aspirates oil within the inner trough at a predetermined rate upwardly through the annular space above the dividing wall 24 into the outer trough 22 and into the stream of air flowing upwardly through the filter material 36. The oil carried into the filter material 36 wets the surface of this material and this oil, as well as oil in the outer trough 22, traps particles of dirt carried into the air filter. Any excessive oil carried into the filter material drains downwardly into the inner trough from which it is recirculated, or directly back to the outer trough 22.

This air filter is easily assembled and may easily be disassembled for cleaning. In addition, it contains a minimum number of parts consistent with superior filter operation.

I claim:

1. An oil bath type air cleaner for a down draft carburetor of the type having an annular flange for receiving the cleaner, said cleaner comprising a lower body portion formed of a sheet metal annulus having an inner flange for engagement with the annular flange of the carburetor, having an upwardly extending imperforate dividing wall forming inner and outer concentric troughs surrounding the inner flange, and having a generally vertical, upwardly extending outer peripheral wall; an upper body portion formed of a sheet metal annulus fitting within the lower body portion and having an outer peripheral wall spaced radially inwardly from and generally parallel to the peripheral wall of the lower body portion to define an air intake passage therebetween, the upper body portion having a series of spaced air passage holes above the outer trough and a series of drain holes above the inner trough of the lower body portion; fibrous filter material within the upper body portion; and a cover engaged with the upper edge of the peripheral wall of the upper body portion; the upper and lower body portions being slightly spaced to form an annular opening above the dividing wall connecting the two troughs of the lower body portion; and a series of spacers pressed from one of said body portions and engaged against the other body portion adjacent the dividing wall to determine the size of the annular opening.

2. An oil bath type air cleaner for a down draft carburetor of the type having an annular flange for receiving the cleaner, said cleaner comprising a lower body portion formed of a sheet metal annulus having an inner flange for engagement with the annular flange of the carburetor, having an upwardly extending imperforate dividing wall forming inner and outer concentric troughs surrounding the inner flange, and having a generally vertical, upwardly extending outer peripheral wall; an upper body portion formed of a sheet metal annulus fitting within the lower body portion and having an outer peripheral wall spaced radially inwardly from and generally parallel to the peripheral wall of the lower body portion to define an air intake passage therebetween, the upper body portion having a series of spaced air passage holes above the outer trough and a series of drain holes above the inner trough of the lower body portion; fibrous filter material within the upper body portion; and a cover engaged with the upper edge of the peripheral wall of the upper body portion; the upper and lower body portions being slightly spaced to form an annular opening above the dividing wall connecting the two troughs of the lower body portion; and a series of spacers pressed from the upper body portion and engaged against the dividing wall to determine the size of the annular opening.

3. An oil bath type air cleaner for a down draft carburetor of the type having an annular flange for receiving the cleaner, said cleaner comprising: a lower body portion formed of a sheet metal annulus having an inner flange for engagement with the annular flange of the carburetor, having an upwardly extending imperforate dividing wall forming inner and outer concentric troughs surrounding the inner flange, and having a generally vertical, upwardly extending outer peripheral wall; an upper body portion formed of a sheet metal annulus fitting within the lower body portion and having an outer peripheral wall spaced radially inwardly from and generally parallel to the peripheral wall of the lower body portion to define an air intake passage therebetween, the upper body portion having a series of spaced air passage holes above the outer trough and a series of drain holes above the inner trough of the lower body portion; fibrous filter material within the upper body portion; and a cover engaged with the upper edge of the peripheral wall of the upper body portion; the upper and lower body portions being slightly spaced to form an annular opening above the dividing wall connecting the two troughs of the lower body portion; and a series of projections carried by one of said body portions and engaged against the other body portion adjacent the dividing wall to determine the size of the annular opening.

4. An oil bath air cleaner as claimed in claim 3, in which the upper body portion has an inner periphery making sealing engagement with the lower body portion adjacent its inner flange.

References Cited by the Examiner

UNITED STATES PATENTS

| 2,590,520 | 3/1952 | Duwos | 55—252 |
| 2,783,855 | 3/1957 | Karn | 55—276 |
| 2,822,855 | 2/1958 | Sebok | 55—252 |
| 2,954,091 | 9/1960 | McMichael | 55—249 X |

FOREIGN PATENTS

| 467,007 | 6/1937 | Great Britain. |

ROBERT F. BURNETT, *Primary Examiner.*

D. K. DENENBERG, *Assistant Examiner.*